United States Patent [19]
Fuller

[11] 3,796,473
[45] Mar. 12, 1974

[54] REEFING SYSTEM

[75] Inventor: Harry V. Fuller, Newport News, Va.

[73] Assignee: The United States of America as represented by the Administrator of the National Aeronautics and Space Administration, Washington, D.C.

[22] Filed: Dec. 29, 1972

[21] Appl. No.: 319,410

Related U.S. Application Data

[62] Division of Ser. No. 99,201, Dec. 17, 1970, Pat. No. 3,729,068.

[52] U.S. Cl. ................................................ 312/1
[51] Int. Cl. ............................................ A61g 11/00
[58] Field of Search ............. 312/1; 188/65.1, 65.5, 188/67; 128/1 R

[56] References Cited
UNITED STATES PATENTS
3,439,966  4/1969  Perkins et al. .......................... 312/1
3,713,480  1/1973  Low .................................. 312/1 X Primary Examiner—James C. Mitchell
Attorney, Agent, or Firm—Wallace J. Nelson; Howard J. Osborn; John R. Manning

[57] ABSTRACT

A device for receiving a cable therethrough and permitting substantially free movement of the cable in a first direction but resisting cable movement in an opposite direction until the forces exerted thereon exceed a predetermined minimum and thereafter permitting free cable movement in said opposite direction.

2 Claims, 5 Drawing Figures

REEFING SYSTEM

This is a division, of application Ser. No. 99,201 filed Dec. 17, 1970, now U.S. Pat. No. 3,729,068.

This invention relates to a cable guide and restraint device and relates in particular to a reefing system for a pliable tube employing a plurality of these devices that permit the tube to be freely expanded and assist in reefing the tube in a uniform manner.

In various operations on interplanetary vehicles planned it is contemplated that certain operations performed thereon be conducted in completely sterile conditions. These operations must be performed in a sterile room and care must be taken to see that the isolated sterile room is not contaminated by earth organisms that may be carried by the workers in the room. One system proposed for use under these conditions is the bio-isolator suit system (BISS) in which a sterile room worker enters a folded tube attached to the wall of the room and dons a sterilized suit sealed on the end thereof. Once on the sterile suit the occupant may move about the sterile room by exerting force on the folded tube and perform the necessary functions in the area without danger of contaminating the sterile room. A system of this type is further described in Oct. 29, 1970, Ser. No. 84,290, now U.S. Pat. No. 3,713,480 problem that has somewhat hampered the development of a system of this type has been the reefing of the expanded tube or tunnel in such manner as to prevent tangling thereof. The present invention appears to solve this and other problems in this area.

It is therefore an object of the present invention to provide a new and novel system for reefing a pliable tube.

Another object of the present invention is a new and novel cable restraint.

A further object of the present invention is a cable restraint that permits free movement of the cable in a first direction but resists movement in an opposite direction until the force exerted thereon exceeds a predetermined minimum.

An additional object of the present invention is a system for gathering a pliable tube one fold at a time until all the material in the tube has been folded and thereafter permitting the extension of the tube with a minimum of resistance.

These and other objects of the present invention are attained by the use of a plurality of unique cable restraints. Each of these cable restraints are constructed to permit the passage therethrough of a cable and to permit substantially unimpeded sliding movement of the cable in a first direction but to restrain the cable from movement in a second direction until the forces exerted thereon exceed a predetermined amount. The cable restraints are disposed as diametrically opposed pairs spaced along the length of two cables extending the length of the pliable tube. One end of each cable is connected to a winch adjacent the bulkhead on which the pliable tube is mounted and the other end of each cable is attached to a terminal block at the end of the pliable tube connected with the sterile suit. When an occupant dons the sterile suit through the folded pliable tube he may walk and expand the pliable tube with little or no resistance from the cable restraints. When it is desired to return the pliable tube to its stowable condition the pair of winches are actuated to exert a constant force on the pair of cables and all the restraints, and the attached tubing material are drawn toward the entrance bulkhead. As the first pair of cable restraints are drawn against a stop adjacent the winches, the tube material is drawn thereagainst by the connection between the tube material and this pair of restraints. The force exerted by the winches is sufficient to overcome the springs within the cable restraints and the restraints bearing against the stop permit the cables to slip therethrough. The remaining restraints, the suit and tubing continues to move with the cables. Thus, the tube material which is between the first pair of restraints which have been stopped, and the second pair which are still moving will begin to fold and continue folding until the second pair of restraints are stopped by the first stopped pair. Each succeeding pair of restraints will stop, in turn, and the material between it and the succeeding restraint pair will fold until the last pair and the terminal blocks are brought up to a positive stop against all the previous pairs. The tubular tunnel will then have been fully folded for stowage. When the suited operator walks away from the entrance wall the winch drums have been released from the gear resistance and since the cable restraints are designed to permit free sliding movement of the cable in one direction, the operator can walk away with only the tunnel drag offering resistance to his movement.

A more complete appreciation of the invention and many of the attendant advantages thereof will be readily appreciated as the same becomes better understood by reference to the following detailed description when considered in connection with the accompanying drawings wherein.

Figures 1, 2, 4:
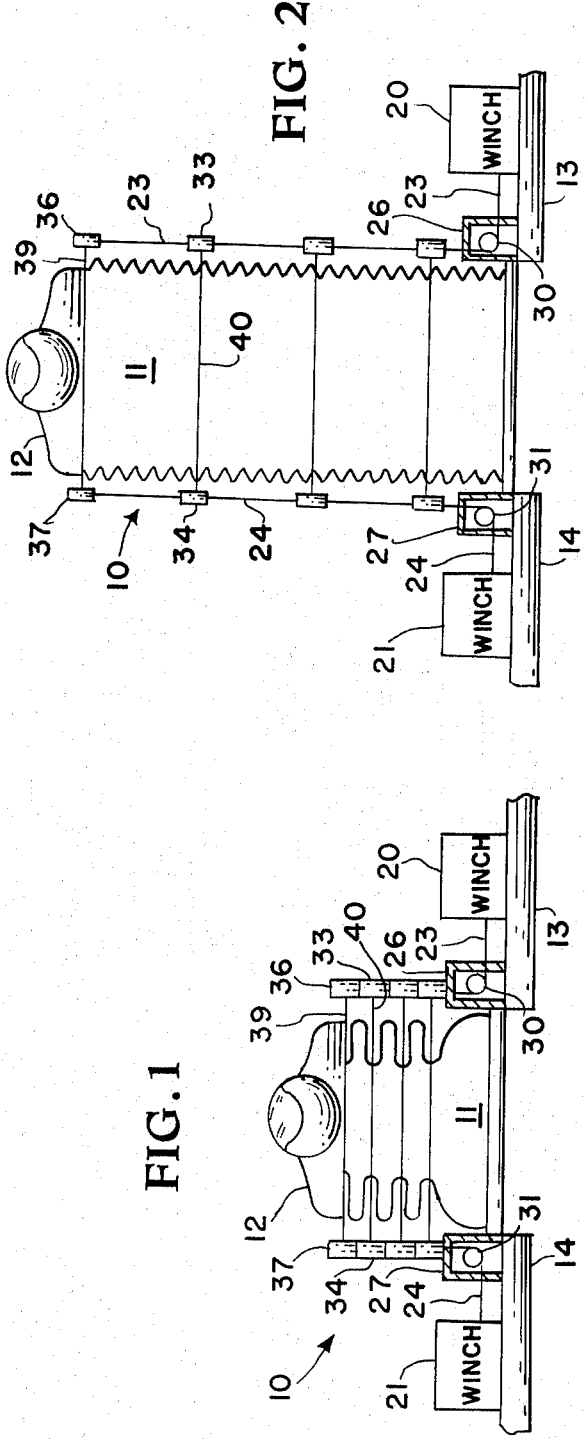
FIG. 1 is a top plan view of a bio-isolator suit system in the folded or stowed condition and employing the reefing system of the present invention.
FIG. 2 is a view of the system shown in FIG. 1 in the open or extended position.
FIG. 4 is a section of the cable restraint shown in FIG. 3 and taken along line 4—4 of FIG. 3.

Referring now to the drawings and more particularly to FIGS. 1 and 2, there is shown a tube reefing system according to the present invention and generally designated by reference numeral 10. The pliable tube 11 with the attached sterile suit 12 is shown in the compact or reefed condition in FIG. 1 as it would appear in a sterile compartment having an inner wall 13 with an opening 14 therein for sealed attachment of the tunnel or tube 11. The material making up tube 11 can be any conventional pliable cloth, plastics or the like that is not permeable to air, water, or microorganisms and that will withstand the sterilization procedures employed for the sterile chamber.

A pair of winches 20 and 21 are disposed on diametric opposite sides of tube 11 adjacent wall 13. A pair of reefing cables 23 and 24 are connected to the respective winches 20 and 21 and extend slidably through respective stop members 26 and 27 and around respective pullys 30 and 31. A plurality of cable retraints, two of which are designated by reference numerals 33 and 34, are disposed along the length of cables 23 and 24. The ends of cables 23 and 24 opposite to that connected to winches 20 and 21 are attached to respective terminal blocks 36 and 37 disposed adjacent suit 12 on diametrically opposed sides of tube 11. Terminal blocks 36 and 37, cable restraints 33 and 34 and the remaining cable restraints, not designated, are maintained in pairs diametrically opposed to each other and spaced from tube 11 by a plurality of rigid connectors 39, 40 and others not designated. These connectors may be formed of rigid plastics, lightweight metal or the like and are fastened to the material making up tube 11 to prevent relative movement therewith as will be further explained hereinafter. The tube 11 is shown herein as having only three pairs of cable restraints for purposes of illustration and simplicity only, it being understood that in practice any number of cable restraints may be employed for reefing of the tube material.

Figure 3:
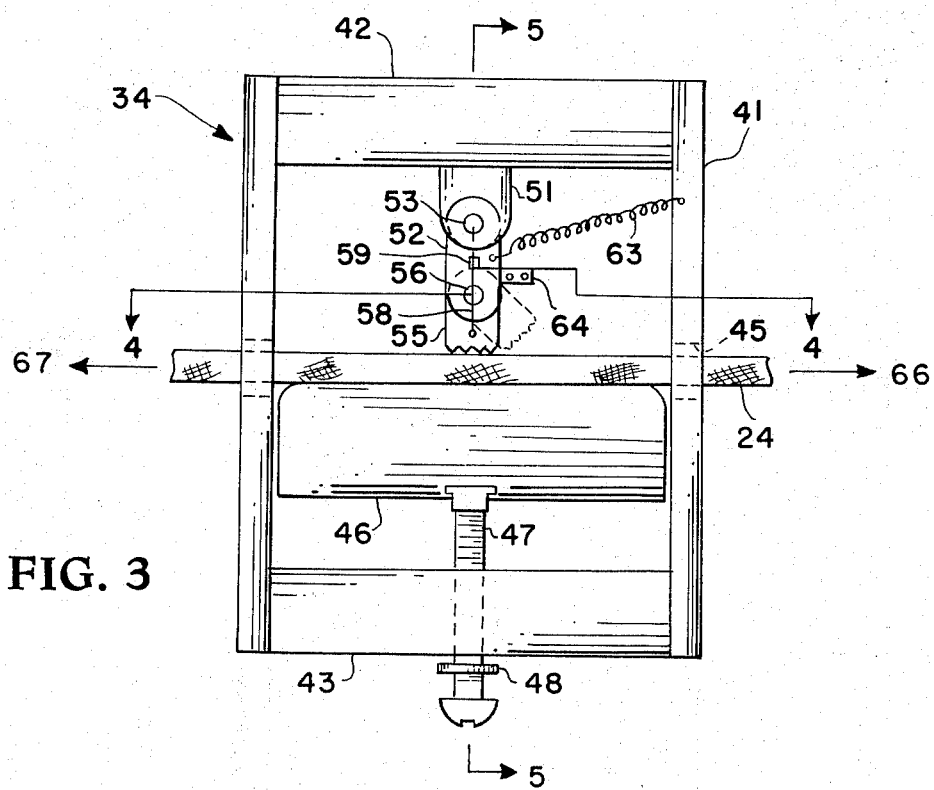
FIG. 3 is a section of one cable restraint according to the present invention.
Figure 5:
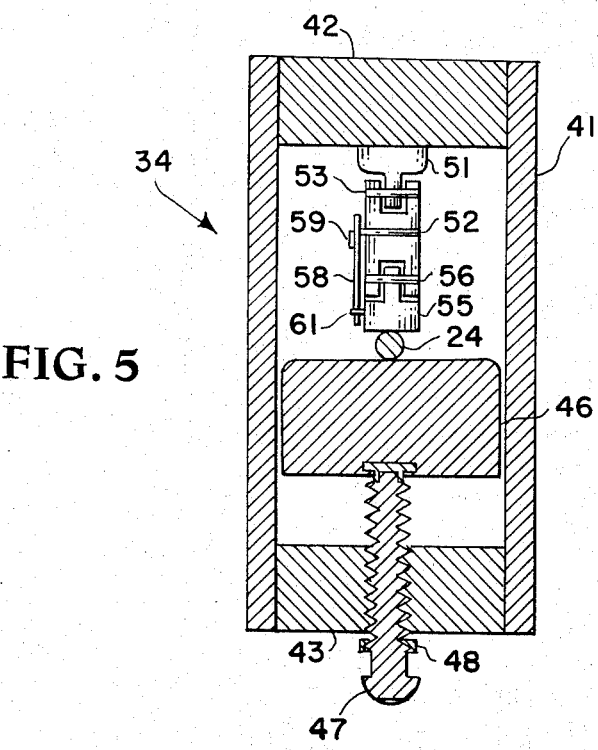
FIG. 5 is a section of the cable restraint shown in FIG. 3 and taken along line 5—5 of FIG. 3.

Referring now more particularly to FIGS. 3, 4 and 5 the details of one cable restraint, generally designated by reference numeral 34, will now be described, it being understood that each of the cable restraints employed are of identical construction and operation. Restraint 34 includes a rectangular housing 41 closed at the ends by a top closure 42 and a bottom closure 43. An opening 45 extends through housing 41 to permit the passage therethrough of cable 24. A resisting anvil 46 is positioned within housing 41 and serves as a smooth surface for cable 24 to slide thereon. Anvil 46 is slidably received in housing 41 and is provided with an adjusting screw 47 rotatably received at the base thereon. Adjusting screw 47 is threadingly received by bottom closure 43 and serves to adjust the position of anvil 46 within housing 41. A lock nut 48 is positioned about adjusting screw 47 to lock the screw in the desired position in a conventional manner. A bracket 51 is integrally attached to top closure 42 with an elongated cam holder 52 pivotally connected thereto by way of pivot pin 53. The other end of cam holder 52 is bifurcated to receive friction cam 55 which is pivotally connected thereto by way of pivot pin 56. One end of friction cam 55 is serrated as shown in FIG. 3 and is adapted to engage cable 24 and exert a force on the cable portion resting on resisting anvil 46. Friction cam 55 is normally maintained against structure formed by the bifurcated end of cam holder 52 by weak leaf spring 58. Thus, one side of the bifurcation is substantially closed (the left side as shown in FIG. 3) while the other side of the bifurcation is open to permit friction cam 55 to freely pivot therein as will be more fully described hereinafter. Leaf spring 58 is fixedly attached at one end to a spring holder 59 integral with cam holder 52. The other end of spring 58 is secured to pin 61 integrally attached to friction cam 55.

Cam holder 52 is normally maintained in the vertical position shown in FIG. 3 under the influence of spring 63 attached thereto at one end with the other end of being attached to housing 41. Spring 63 is normally under tension to maintain cam holder 52 against a stop 64 integrally extending from a sidewall of housing 41.

OPERATION

The operation of the invention is now believed apparent. When utilizing the cable restraints 33, 34 and others, not designated, in a tube reefing system 10, cables 23 and 24 are connected as shown in FIGS. 1 and 2 with the cables passing through each restraint as shown in FIG. 3 for cable 24 and restraint 34. When the operator enters folded tube 11 (FIG. 1) and dons suit 12 he may walk away from wall 13 of the sterile chamber with substantially the only resistance being offered by the weight of the material making up tube 11. Thus, cables 23 and 24 would move in the direction of the arrow 67 to cause friction cam 55 to pivot to the left as shown in this Figure resisted only the weak spring 63 to release cable 24 from frictional tension. The drums of winches 20 and 21 are disengaged from the gearing therein during this operation to permit free rotation thereof. After completion of the tasks performed by the operator of suit 12, tube 11 may be reefed by actuating winches 20 and 21 to exert a force on cables 23 and 24. This force is exerted in the direction of the arrow 66 (FIG. 3) on each of the cables. When the synchronized winches are started all the restraints, both cables, and the attached tubing and suit are drawn toward wall 13. When the first pair of restraints near wall 13 reach stop members 26 and 27 they are stopped thereby and no cable movement can occur until the predetermined set force resistance on the cables is exceeded. This set resistance is controlled by the position of the anvil 46, (FIG. 3). Thus, cam holder 52 maintains friction cam 55 in positive engagement with cable 24 when a force is exerted thereon in the direction of arrow 66. When this force overcomes the cable 24 resistance to compression cam 55 will pivot about pivot pin 56 (to the right as shown in FIG. 3) and permit cable 24 to move with no additional resistance. The remaining restraints, suit 12 and tube 11 will continue to move along with the cables. Consequently, the tube material which is between the first pair of restraints which have been stopped, and the second pair of restraints which are still moving will begin to fold and will continue to fold until the second pair of restraints bear against the first pair and are stopped thereby. Each pair of restraints will stop, in turn, and the material between it and the succeeding device will fold until the terminal blocks 36 and 37 are brought to a positive stop against all the previous pairs of restraints as shown in FIG. 1. The tube will then be fully folded and stored.

There are many modifications and variations of the invention that will be readily apparent to those skilled in the art in the light of the above teachings. For example, leaf spring 58 may be replaced by a coil spring received about pivot pin 56 and attached to cam holder 52 and friction cam 55. Also, a constant force spring could be positioned between adjusting screw 47 and resisting anvil 46 if so desired. Although the cable restraints have been described relative to a tunnel reefing system the invention is not so limited and any use thereof where it is desired that a structure resists a force of a predetermined amount and thereafter release structure for movement in response to the force is considered within the teachings of this invention. For example, the cable restraints described herein could be employed as a governor on a hopper or the like, where a fixed weight would be attached to one end of the cable with the cam holder 52 and cam 55 being designed to release a trap door when the load exerted thereon exceeded the fixed weight. These and other modifications and variations are considered possible in the light of the above teachings.

It is therefore to be understood that the invention may be practiced otherwise than as specifically described.

What is claimed as new and desired to be secured by Letters Patent of the United States is:

1. A system for reefing a pliable tube comprising:

a pair of cables of adequate length to extend the length of said tube and positionable on diametric opposite sides of said tube, a pair of winches disposed on diametric opposite sides of said tube at one end thereof and serving to receive said pair of cables, a stop member adjacent each said winch for slidably receiving said cables, a plurality of cable restraints disposed in spaced relationship along the length of said cables, means connected to said tube at spaced intervals along the length thereof and connecting said plurality of cable restraints in diametrically opposed pairs, a terminal block connected to the end of each said cable opposite the end thereof attached to said winches, means connected to said tube adjacent the end thereof and attached to each said terminal block, and each said cable restraint being adapted to permit the cable to substantially freely slide therethrough when a force is exerted on the cable in a first direction and to restrain the cable from relative sliding movement in a second direction until a predetermined force is exerted on said cable in the second direction and thereafter to permit relative sliding movement of the cable.

2. The system of claim 1 including said pliable tube being air, water and germ impervious and having an occupant suit sealed to said tube at one end thereof, said tube being open at the other and sealingly attached to a wall opening, said system being adapted to permit an occupant to enter said tube, don said suit and perform manual functions within a sterile chamber containing said suit and tube with said tube being adapted to expand with minor resistance as the suit occupant walks in the sterile chamber, said tube being adapted to be reefed in folded condition by said cables, restraints, and winches when the occupant suit is not in use.

* * * * *